H. CHRISMAN.
WET GAS METER.
APPLICATION FILED JUNE 30, 1917.
1,305,883.
Patented June 3, 1919.
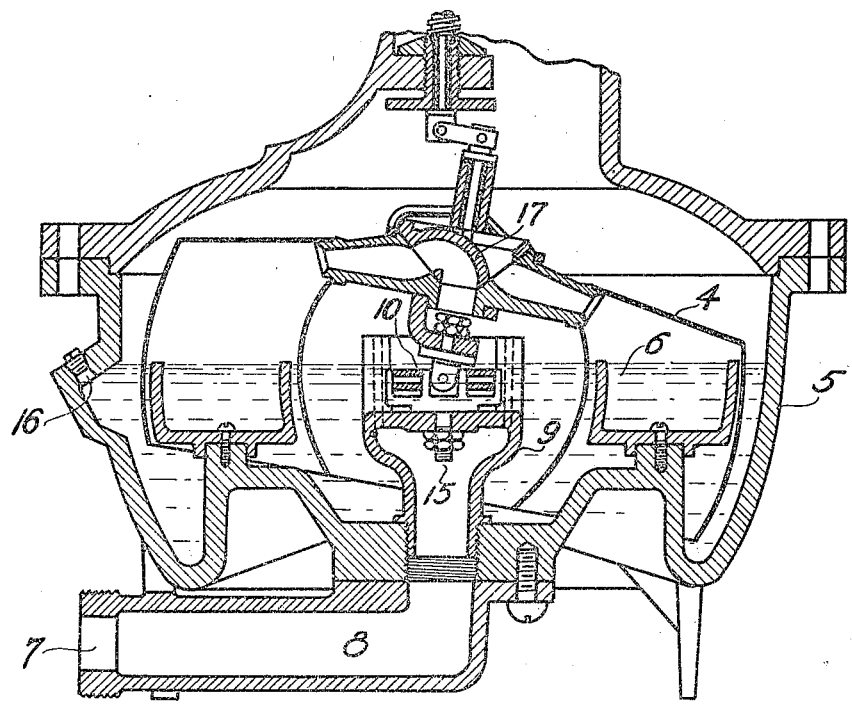
Fig. 1
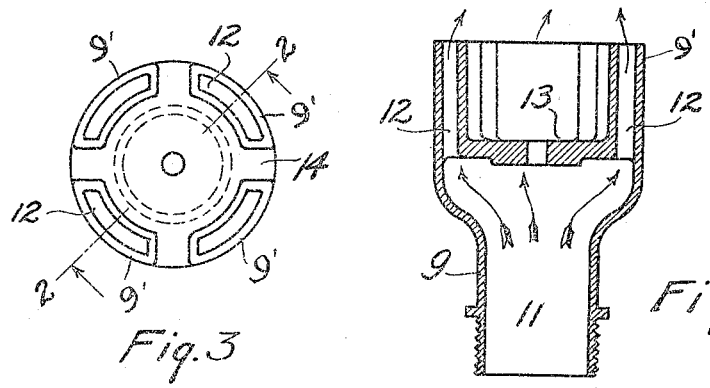
Fig. 3
Fig. 2
INVENTOR.
Horace Chrisman
BY
Green & McCallister
ATTORNEYS.

UNITED STATES PATENT OFFICE.

HORACE CHRISMAN, OF EDGEWOOD, PENNSYLVANIA, ASSIGNOR TO PITTSBURGH METER COMPANY, OF EAST PITTSBURGH, PENNSYLVANIA, A CORPORATION OF PENNSYLVANIA.

WET GAS-METER.

1,305,883.  Specification of Letters Patent.  Patented June 3, 1919.

Application filed June 30, 1917. Serial No. 178,025.

*To all whom it may concern:*

Be it known that I, HORACE CHRISMAN, a citizen of the United States, and a resident of Edgewood, in the county of Allegheny and State of Pennsylvania, have made a new and useful Invention in Wet Gas-Meters, of which the following is a specification.

This invention relates to wet gas meters and more particularly to a new and improved means for lubricating the universal joint of the meter drum of such meters.

One of the difficulties encountered in wet gas meters is that the bearing of the principal moving element of the meter is located in an inaccessible position so far as lubrication is concerned, and an object of the present invention is to produce a simple and effective means for lubricating the universal joint or the bearing of the meter drum.

This, and other objects, which will be made apparent throughout the further description of the invention, are attained by the features herein described and illustrated.

In the drawings accompanying and forming a part hereof, Figure 1 is a fragmental, sectional view of a meter equipped with my invention.

Fig. 2 is a sectional view of a gas delivery pedestal which forms a detail of the present invention.

Fig. 3 is a plan view of the pedestal shown in Fig. 1.

Referring to the drawings, the apparatus illustrated is an ordinary form of wet gas meter. The drum 4 is inclosed within a casing 5, which forms a receptacle for the sealing liquid 6 of the drum. The casing is provided with the usual gas outlet or delivery port and the drum is provided with the usual means for successively connecting its separate chambers with the delivery and inlet ports of the meter. The inlet port 7 of the meter illustrated communicates with a passage 8, which communicates with a gas passage formed in a pedestal 9. The pedestal 9 projects upwardly through the sealing liquid 6, and, as illustrated, forms a standard on which the universal joint 10 of the drum 4 is mounted. The portion 13 of the pedestal, on which the joint 10 is mounted is located below the normal level of the liquid 6. For the purpose of providing gas passages through the sealing liquid and at the same time for providing means for introducing lubricant to the universal joint, I have so formed the pedestal that the main gas passage 11 communicates with one or more gas passages 12, which are so arranged with relation to the supporting member 13 that sealing liquid surrounds and partially or wholly submerges the universal joint. In the illustrated embodiment the pedestal is provided with four annularly disposed nozzles 9' each having a gas passage 12, and they are so spaced as to provide four apertures or passages 14 which are located between the passages 12 and which are so arranged as to conduct sealing liquid to the universal joint. As illustrated, the universal joint is secured by means of a stud screw 15 and suitable nuts to the portion 13 of the pedestal.

In assembling the parts of the meter, the universal joint and the drum may be secured to the pedestal after the pedestal has been secured to the casing 5. The gas passage 8 may then be secured to the casing and the top of the casing may be secured in place. Any suitable means, such as the aperture 16, may be provided for admitting sealing liquid into the interior of the casing after the drum and the pedestal are in place and the casing is sealed. The gas entering the inlet 7 flows upwardly through the pedestal passages and is delivered to the distributing chamber of the drum. From this chamber it is delivered to the successive measuring chambers of the drum by means of the valve 17. In the apparatus illustrated the valve 17 also controls the delivery of gas from the measuring chambers to the delivery chamber of the meter.

While I have illustrated but one modification of my invention, it will be apparent to those skilled in the art that various changes, modifications, additions, and omissions may be made in the apparatus described and illustrated without departing from the spirit and scope of the invention, as set forth by the appended claims.

What I claim is:

1. In combination in a meter, a casing inclosing a liquid seal chamber, a measuring drum located within said casing, a pedestal secured to the casing and projecting into said seal chamber and having a gas delivery passage formed therein which terminates within said meter casing in annularly disposed discharge passages opening well above the normal level of sealing liquid within said chamber, a bearing support formed on the pedestal and submerged by the sealing liquid within said chamber, and a bearing for said drum mounted on said support.

2. In combination in a meter, a casing inclosing a liquid seal chamber, a measuring drum located within the casing, a pedestal located within the casing and extending upwardly through the liquid of said liquid seal chamber, annularly disposed gas delivery passages formed within said pedestal and extending above the normal level of sealing liquid within said chamber, a bearing support formed on said pedestal centrally disposed with respect to the said passages and below the normal liquid level within said chamber, a passage formed in said pedestal for delivering sealing liquid to and over said support and a universal joint forming a support for said drum, mounted on said support.

3. In combination in a meter, a casing inclosing a liquid seal chamber, a measuring drum located within the casing, a pedestal having a gas passage formed therein, secured to the casing and projecting upwardly through the liquid within the seal chamber and terminating in a plurality of spaced nozzles, a bearing support formed on said pedestal below the level of the liquid within the chamber and between the said passages, a universal joint mounted on said support and forming a bearing for the drum, and adapted to be lubricated by sealing liquid flowing between the nozzles.

In testimony whereof, I have hereunto subscribed my name this 29th day of June, 1917.

HORACE CHRISMAN.

Witnesses:
C. W. McGHEE,
CAROLINE LOEWENTHAL.

Copies of this patent may be obtained for five cents each, by addressing the "Commissioner of Patents, Washington, D. C."